United States Patent
Wahli

[11] 3,673,417
[45] June 27, 1972

[54] PHOTOELECTRIC SCANNING APPARATUS FOR DETECTING CODE MARKINGS

[72] Inventor: Robert Wahli, Unterengstringen, Switzerland

[73] Assignee: Ciba-Geigy AG

[22] Filed: Aug. 7, 1970

[21] Appl. No.: 62,088

[30] Foreign Application Priority Data

Aug. 12, 1969 Switzerland ................12217/69

[52] U.S. Cl. ..................250/219 D, 250/227, 250/223 B
[51] Int. Cl. ...................................................G08c 9/06
[58] Field of Search..............250/219 D, 219 DC, 227, 226, 250/216, 223 B; 350/96 B

[56] References Cited

UNITED STATES PATENTS

| | | | |
|---|---|---|---|
| 3,106,706 | 10/1963 | Kolanowski et al.................250/223 X |
| 3,327,584 | 6/1967 | Kissinger............................250/227 X |
| 3,566,120 | 2/1971 | Lane...................................250/226 X |
| 3,576,358 | 4/1971 | Hayamizu..........................350/175 TS |
| 2,627,199 | 2/1953 | O'Brien.............................250/219 CR |
| 3,581,102 | 5/1971 | Nagao..................................250/227 |

*Primary Examiner*—Walter Stolwein
*Attorney*—Pierce, Scheffler & Parker

[57] ABSTRACT

A photoelectric scanning head is provided for identifying ampoules by detecting different combinations of color-coded rings on the necks of the ampoules which are moved past the head in a direction aligning the axes of the ampoules at right angles to their direction of travel. The head includes a plurality of first optical systems having lenses arranged in a staggered relationship in relation to the direction of travel of the ampoules, the lenses imaging light from the code rings via associated optical fibers to a photosensitive device which provides signals corresponding to the coding provided by said rings to identify the ampoule being scanned. The rings are illuminated by a plurality of second optical systems which comprise a bundle of optical fibers which guide separate beams of light from a source onto the rings as they are being scanned. The ends of the optical fibers of the second optical systems are positioned in the head in the same staggered relationship as the lenses of the first optical systems.

4 Claims, 6 Drawing Figures

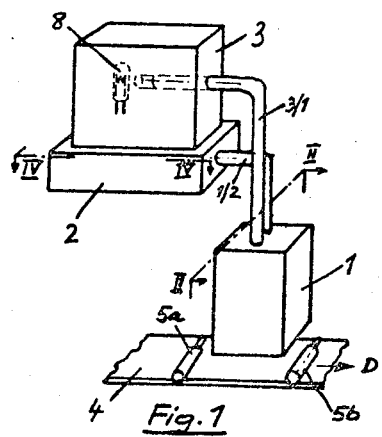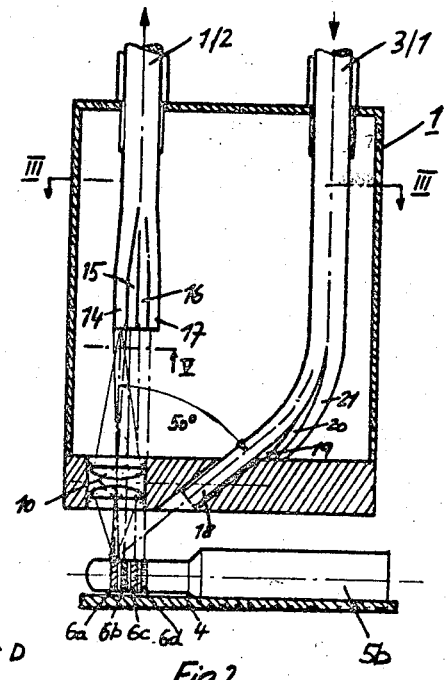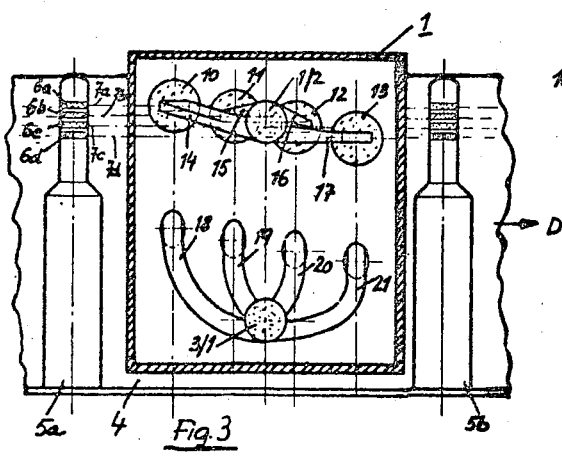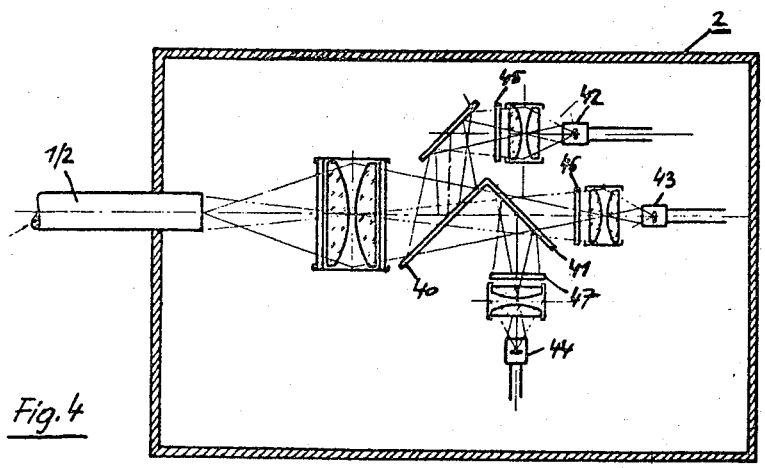

Inventor
Robert Wahli

By Pinn, Scheffler & Parker
Attorneys

PHOTOELECTRIC SCANNING APPARATUS FOR DETECTING CODE MARKINGS

This invention relates to photoelectric scanning apparatus for identifying objects by detecting code markings carried by those objects.

This form of scanning is particularly useful in scanning colored rings carried on the neck of glass ampoules for identifying their contents prior to their being labeled in a labeling machine. The ampoules are usually carried on a conveyor belt so that the axis of the ampoules are at right angles to the direction of movement of the belt which allows for some rolling motion of the ampoules as they are conveyed past a scanning head. The code markings being on the neck of the ampoule are presented to the scanning head along a line which is at right angles to the direction of movement of the belt. One known form of scanning head utilizes a rotating prism or an oscillating mirror to scan the code markings as they travel beneath the scanning head while another form of scanning head utilizes a rotating drum having apertures therein which scans the code markings as the ampoules are held stationary. This latter form of scanning thus requires intermittent motion of the conveyor belt.

The object of this invention therefore is to provide apparatus which uses optical systems for illuminating colored code markings and senses them, the systems being positioned in such a manner that continuous movement of the ampoules past the head causes scanning of the code markings and obviates the need for any rotary or moving parts in the head.

In accordance with the present invention therefore photoelectric scanning apparatus is provided comprising a photosensitive device, a plurality of first optical systems each imaging a different area of a surface onto said photosensitive device as said areas are moved past said optical systems, a light source, and a plurality of second optical systems each projecting a separate light beam from said source onto a different one of said areas as they pass said first optical systems whereby said photosensitive device produces signals representing the reflectivity of the different areas of said surface illuminated by corresponding separate light beams provided by said second optical systems.

This type of apparatus allows code elements to be scanned in a purely static manner.

In order that the invention may be fully understood preferred embodiments thereof will now be described with reference to the accompanying drawings in which:

FIG. 1 is a simplified perspective overall view of apparatus for scanning color coded markings on the necks of ampoules in accordance with this invention.

FIG. 2 is an enlarged section along line II—II of FIG. 1.

FIG. 3 is an enlarged section along line III—III of FIG. 2.

FIG. 4 is an enlarged section along line IV—IV of FIG. 1.

Figure 5:
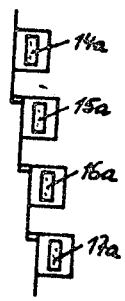
FIG. 5 is a schematic view in the direction of the arrow V of FIG. 2.

The apparatus shown comprises three separate units, that is a photoelectric scanning head 1, a photosensitive device 2, and a lamp housing 3, although these units could all be incorporated in a single housing. The scanning head 1 is mounted above a conveyor belt 4 which carries ampoules 5a, 5b having color-coding rings on the necks thereof in the direction marked by the arrow D. The rings are spaced equidistantly one from another on the neck of an ampoule and are of the same width tracing out parallel tracks 7a, 7b, 7c, and 7d as they move past the head 1 as shown in FIG. 3. A plurality of first optical systems is provided in the head 1 and comprises lenses 10, 11, 12, and 13 and associated optical fibers 14, 15, 16, 17 which merge into a common bundle, one-half emerging from the top of the scanning head 1 to enter the photosensitive device 2. The axes of the lenses 10 to 13 are centered on the tracks 7a to 7d respectively and each optical fiber 14 to 17 is of rectangular cross-section which is positioned relative to its associated lens so that the lens images the code-ring onto the end of the optical fiber which passes the image to the photosensitive device 2. Moreover, as will be readily observed from FIG. 3, the respective axes of the lenses 10 to 13 are mounted in staggered relationship relative to the path of movement of the objects so that the four code markings 6a to 6d passing respectively along the tracks 7a to 7d fall sequentially within the field of view of the lenses 10 to 13. The distance between the lenses 10 and 13 is arranged to be less than the distance between the ampoules on the belt 4 so that the lenses scan the code markings in sequence and on only one ampoule at a time.

To illuminate the code markings a plurality of second optical systems is provided in the head and comprises optical fibers 18, 19, 20, and 21 which merge together into a common bundle 3/1 and exit from the top of the head 1 to enter the lamp housing 3 having therein a halogen incandescent lamp 8. The ends of the optical fibers 18 to 21 are held in position by passageways formed in the base of the head housing. The passageways are angled at 50° to the axes of the lenses 10 to 13 as shown in FIG. 2 so the separate light beams formed by the optical fibers 18 to 21 are projected onto the code rings, the passageways being in the same staggered relationship to the direction of travel of the belt 4 as the lenses 10 to 13.

As the code rings are moved past the scanning head 2 they are illuminated by the separate light beams projected by the optical fibers 18 to 21 and the optical fibers 14 to 17 pass to the photosensitive device 2 different colored beams corresponding to the different colors of the code rings (FIG. 5).

The photosensitive device 2 comprises a housing into which enters the common bundle of optical fibers 1/2, projecting via a lens system, the colored beams onto dichroic filters 40, 41. The first dichroic filter 40 reflects red light and passes blue and green lights onto the dichroic filter 41 which reflects blue light and transmits green light onto a photoelectric cell 43 via a narrow band filter 46 and a focusing lens. The blue light reflected by dichroic filter 41 passes through a narrow band filter 47 and a focusing lens onto a photoelectric cell 44, while the red light reflected from the dichroic filter 40 is passed through a narrow band filter 45 and a focusing lens onto a photoelectric cell 42. The colors used for the rings can be either primary or complementary colors or both. Furthermore the filters used in the photosensitive device 2 can split the light received up into primary colors.

The electric signals produced by the three photoelectric cells 42, 43, and 44 are fed to an indicating device (not shown) which evaluates the signals to identify the ampoule.

When the distance of the code markings from the lenses 10 to 13 remains substantially constant as in the above described apparatus using a preferred form of scanning head, normal forms of lenses can be used. However if the code markings are on objects of irregular shape or objects which may deform so that the distance of the code markings from the scanning head varies to such an extent as cannot be accommodated by the depth of field of the lenses 10 to 13 then it is preferable to replace each of the lenses 10 to 13 with a telecentric optical system such as that illustrated in FIG. 6.

Figure 6:
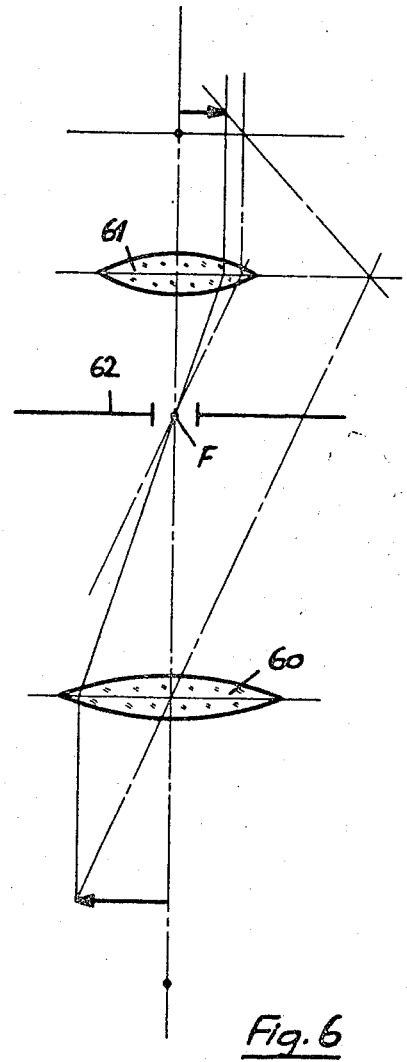
FIG. 6 shows a special form of objective for use in the scanning head shown in the previous figures.

The optical system shown in FIG. 6 comprises two lenses (or groups of lenses) 60, 61 having their focal points coincident in the plane of an aperture in a mask 62. The magnification of the system does not change with changing distance of the object from the lens 60 and since substantial elimination of non-axially parallel rays is achieved by the system shown a substantial depth of field is provided. An advantage of constant magnification for changing lens-object distance is that an image of a code marking on an ampoule produced by the telecentric optical system can be closely matched to the associated optical fiber, as shown for example in FIG. 5.

What is claimed is:

1. Photoelectric scanning apparatus for identifying objects by detecting code markings on the objects as the objects are moved along a predetermined path, the markings being spaced one from another and arranged in a direction transverse to the direction of movement of the objects, so as to trace out a corresponding number of parallel tracks, the apparatus comprising a housing, a plurality of optical systems, one for each code marking track, mounted in said housing in alignment with the corresponding track and in staggered relationship relative to the path of movement of said objects so that the code markings fall sequentially within the field of view of their respective optical systems as the object carrying said markings is moved along said path, a photosensitive device, a first set of optical fibers each guiding light from a different one of said optical systems to said photosensitive device, a light source, and a second set of optical fibers guiding light from said source to the plane of said code markings, the end portions of the fibers of said second set being held in said housing in the same staggered relationship to the direction of movement of the objects as said optical systems but inclined at such an angle to the axis of said optical systems that each of the individual beams of light emitted from said end portions of said second set of fibers intersect one of the axes of said optical systems in one of the tracks of the code markings.

2. Photoelectric scanning apparatus according to claim 1, wherein each of said optical systems includes a telecentric optical arrangement of lenses.

3. Photoelectric scanning apparatus according to claim 1, wherein said first and second sets of optical fibers are merged together to form a first and a second common bundle adjacent to said photosensitive device and said light source respectively, said photosensitive device including a plurality of means for splitting the light received from said first bundle of optical fibers into different colored light beams and further including a plurality of photocells each responsive to the intensity of a different one of the colored light beams, said optical fibers merging together within said housing and said second and first common bundles emerging from said housing to receive light from said source and projecting light onto said photosensitive device respectively.

4. Photoelectric scanning apparatus according to claim 3, wherein said means for splitting the light and said photocells are contained within a separate third housing into which enters the first bundle of optical fibers.

* * * * *